Sept. 1, 1959  E. HUTTER  2,902,422
NUCLEAR REACTOR FUEL ROD ASSEMBLY
Filed July 29, 1953
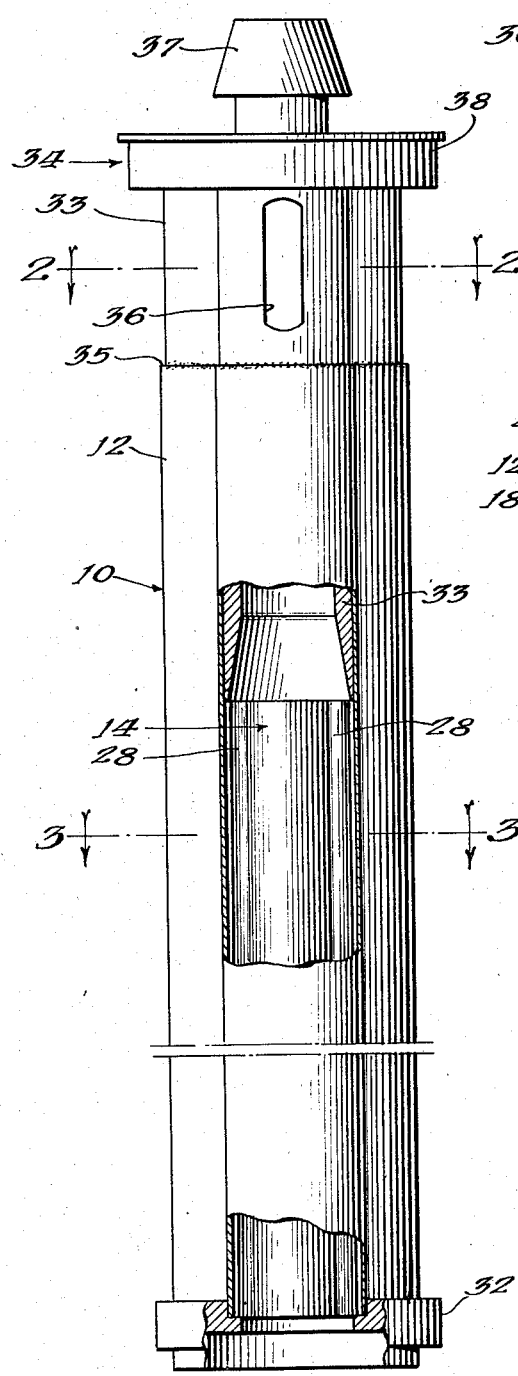
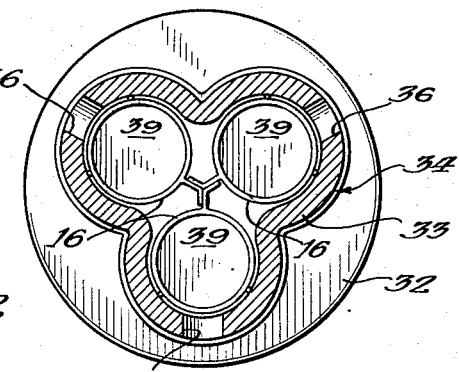
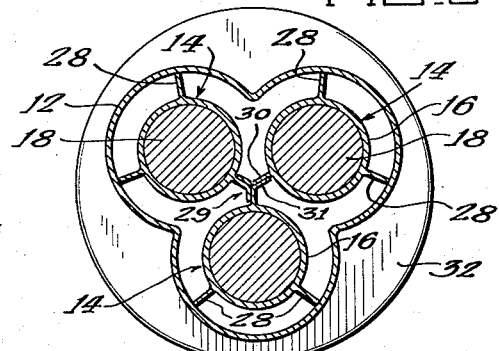
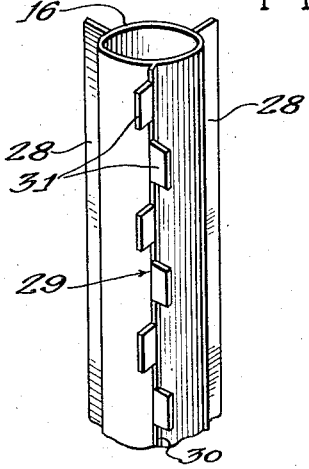
INVENTOR.
Ernest Hutter
BY
Roland A. Anderson
Attorney United States Patent Office 2,902,422
Patented Sept. 1, 1959

2,902,422

NUCLEAR REACTOR FUEL ROD ASSEMBLY

Ernest Hutter, Chicago, Ill., assignor to the United States of America as represented by the United States Atomic Energy Commission Application July 29, 1953, Serial No. 376,278

5 Claims. (Cl. 204—193.2)

This invention relates to a tubular heat exchanger and more specifically to the use thereof with fuel rods of a neutronic reactor.

When heat is exchanged between substances within and without a tube of a heat exchanger, it may be desirable to make the tube diameter relatively small. If the structure is relatively long, there is the problem of supporting the structure against bending. According to the present invention, the tubes of the structure are arranged in clusters that have the requisite stiffness to resist bending.

For special reasons that have to do with reactor theory and operation, it may be desirable to group fuel rods of a neutronic reactor in clusters and to incorporate them in a heat exchanger of the above type. For details of theory and essential characteristics of neutronic reactors, reference is made to Fermi et al. Patent 2,708,656, dated May 17, 1955; Wigner et al. Patent 2,736,696, dated February 28, 1956; and Wigner et al. Patent 2,770,591, dated November 13, 1956.

An object of this invention is to fit a cluster of fuel rods together in such a positive manner as to prevent any longitudinal displacement of one or more rods within the enclosing casing.

Other objects will become apparent upon proceeding with the following specification in view of the accompanying drawings, in which:

Fig. 1 is an elevational view, partly in section, of a portion of a fuel element;

Fig. 2 is a horizontal sectional view taken on the line 2—2 of Fig. 1;

Fig. 3 is a horizontal sectional view taken on the line 3—3 of Fig. 1; and

Fig. 4 is a perspective view of a portion of a fuel jacket used in the assembled fuel element.

In Fig. 1 a fuel element, generally indicated at 10, is an elongated assembly comprising a casing 12 and a plurality of fuel rods 14, which are three in number in the embodiment of the invention illustrated in the present application. Each fuel rod 14 comprises a fuel jacket 16 and a body 18 of material containing an isotope fissionable by thermal neutrons, such as $U^{235}$, $U^{233}$, and $Pu^{239}$. As is shown in Figs. 1 and 3 the fuel rods 14 are located within the casing 12 and extend over a greater portion of the length thereof.

Although the scope of this invention is intended to include any number of fuel rods 14 within the casing 12, the preferred modification includes three rods, as shown in Fig. 3. Accordingly, the design of the casing 12 is adapted to serve as a housing for the fuel rods 14 to keep them in their proper positions with respect to each other. In the particular modification shown in the drawings, the contour of the casing is a trefoil or three-lobed casing as shown in Figs. 1 and 3. The exterior of each portion of the trefoil is circular. As shown in Fig. 3, each fuel rod 14 is disposed concentrically with respect to the particular portion of the casing 12 in which it is disposed. However, concentricity is not necessary for the purpose of this invention.

In order to maintain the proper location of each fuel rod 14 within the casing 12, each jacket 16 is provided with two longitudinal fins 28 and one longitudinal fin 29, which may be formed integral with the jacket. The fins are generally equally spaced about the periphery of the jacket. The fins 28 are straight and extend radially or substantially so outward from the jacket 16 into contact with the internal surface of the casing 12. Each fin 29 comprises a straight generally radial portion 30 and a plurality of serrations or spaced teeth 31 which extend from the radial portion 30 alternately to different sides of the plane of the radial portion 30. The teeth 31 are bent out of said plane by about 60 degrees. The fins 29 of the three fuel rods 14 engage one another at the central region of the casing 12 in such a way that for each fin 29 one set of alternate teeth 31 contacts the portion 30 of one of the two remaining fins 29, the other set of alternate teeth 31 engages the portion 30 of the other of the two remaining fins 29, and the longitudinal ends of the teeth 31 of each fin 29 are engageable with the longitudinal ends of the teeth 31 of the other two fins 29 so that the fuel rods 14 are held against longitudinal movement with respect to one another.

The casing 12 and the jackets 16 are formed of corrosion-resistant material having low neutron-absorbing characteristics, such as aluminum or its alloys or zirconium or its alloys. An example of a suitable material is an alloy composed of 98.9% aluminum, 0.4% silicon, 0.7% magnesium. The casing 12 and the jackets 16 may be formed by extrusion.

The fuel rods 14 and casing 12 fit in a base member 32 which may be of the same material as the jackets 16 and the casing 12. The casing may be bonded to the base member 32. The upper end of the casing 12 receives a trefoil portion 33 of a fitting 34, which portion tightly fits the interior of the casing in abutment with the upper ends of the fins 28 of the fuel rods 14 and extends beyond the upper end of the casing. The upper end of the casing may be bonded to the trefoil portion 33 of the fitting 34 as indicated at 35 in Fig. 1. The fitting 34 may be formed of the same material as the casing 12 and the jackets 16. As seen in Fig. 2, the trefoil portion has three openings 36 and is hollow so that a coolant may reach the upper ends of the fuel rods 14 from the exterior of the assembly 10. The fitting 34 has a conical portion 37 by which the assembly may be lifted and a shouldered head 38.

The head and the base member 32 are adapted to mount the assembly 10 in the top and bottom plates of a heavy-water reactor in the manner disclosed in the copending application of Arthur B. Schultz, Serial No. 376,277, filed July 29, 1953. It is contemplated, for example, that heavy water may enter the upper end of the assembly 10 through the openings 36 and leave the assembly through the base member 32 and that the assembly will be immersed in heavy water. The jackets 16 protect the fissionable bodies 18 from corrosion. The ends of the fissionable bodies will, of course, be protected from the heavy water by suitable caps 39 formed of the same material as the jackets 16.

It will be appreciated from the foregoing description that a novel structure has been provided in which a plurality of fuel rods are grouped in a single assembly. Thus the fuel rods are relatively small in diameter with the result of relatively efficient heat exchange for cooling, and the fuel rods, being structurally linked together, can resist the mechanical stresses to which they may be subjected.

A significant feature of the present construction is that the fuel rods are connected to one another through the ribs 29 which extend to the central region of the casing 12 and are interlocked with one another and thus prevent longitudinal movement of one fuel rod with respect to the other fuel rods.

In the various modifications described the fissionable bodies 18 may be omitted from the jackets, and the jackets become tubes that may conduct a liquid from which heat is to be abstracted by the coolant outside the tubes and within and outside the casings. The caps will be omitted from the jackets so that the liquid to be cooled may flow into the tubes at one end and out of the tubes at the other end. The tubes will be attached to suitable pipes, fittings, or headers so that the liquid within the tubes is kept from mixing with the coolant outside the tubes.

The intention is to limit the invention only within the scope of the appended claims.

What is claimed is:

1. A fuel element for a neutronic reactor comprising an elongated casing, and at least two fuel rods within the casing, each unit comprising a tubular jacket, a body of fissionable material therein, and a plurality of longitudinal fins on the outer surface of the jacket extending radially therefrom and being equally spaced about the exterior of the jacket, certain fins extending to the interior surface of the casing, the remaining fins of the jackets extending to the center of the casing and having serrations along the longitudinal edge thereof interlocked with each other to prevent relative longitudinal movement of the jackets.

2. A fuel element for a neutronic reactor comprising an elongated casing, and a plurality of fuel rods within the casing, each unit comprising a fuel jacket and a body of thermal-neutron-fissionable material therein, and a plurality of longitudinal fins on the outer surface of the jacket extending radially therefrom, all but one of the fins extending to the interior surface of the casing, the remaining fin of each jacket extending substantially to the center of the casing and having serrations rotated out of the plane of the fin through an angle equal to 180° minus the quotient of 360° divided by the number of fuel elements at an angle to the plane of the fin equal to the quotient of the number of fuel elements divided into 360°, whereby the serrations of the said remaining fins are interlocked with one another to prevent relative longitudinal movement of the jackets.

3. The fuel element specified in claim 2, each said remaining fin having alternate serrations rotated in opposite directions from the plane of the fin.

4. A fuel element for a neutronic reactor comprising an elongated casing of a trefoil cross section, each foil having a circular shape, and an elongated fuel rod within each foil, each rod comprising a body of thermal-neutron-fissionable material and a circular jacket containing the fissionable material and having a plurality of longitudinal fins on the outer surface extending substantially radially therefrom and being equally spaced about the periphery of the jacket, all but one of said fins extending to the interior surface of the corresponding foil, and the remaining fin extending to a central region of the trefoil and having along the longitudinal edge serrations rotated 60° in opposite directions out of the plane of the fin, whereby the fins having the serrations are interlocked with each other to prevent relative longitudinal movement of the fuel rods.

5. A fuel element for a neutronic reactor comprising an elongated casing of a trefoil cross section, each foil having a circular exterior, and an elongated fuel rod within each foil, each rod comprising a body of thermal-neutron-fissionable material therein and a circular jacket containing the fissionable material and having three longitudinal fins on the outer surface extending substantially radially therefrom and being equally spaced about the periphery of the jacket, two of said fins extending to the interior surface of the corresponding foil, the third fin extending to a central region of the trefoil and having a plurality of serrations rotated alternately 60° clockwise and 60° counterclockwise to the plane of the fin, and being spaced so that the serrations of the third fins of the three jackets interlock one above another and prevent relative longitudinal movement of the jackets.

References Cited in the file of this patent

UNITED STATES PATENTS

| | | |
|---|---|---|
| 1,256,116 | Dempsey | Feb. 12, 1918 |
| 1,511,056 | Ercanbrack | Oct. 7, 1924 |
| 1,739,137 | Gay | Dec. 10, 1929 |
| 2,017,676 | Von Girsewald et al. | Oct. 15, 1935 |

FOREIGN PATENTS

| | | |
|---|---|---|
| 3,389 | Great Britain | of 1915 |

OTHER REFERENCES

Walker et al.: "Nucleonics," March 1952, pages 58–60.